UNITED STATES PATENT OFFICE.

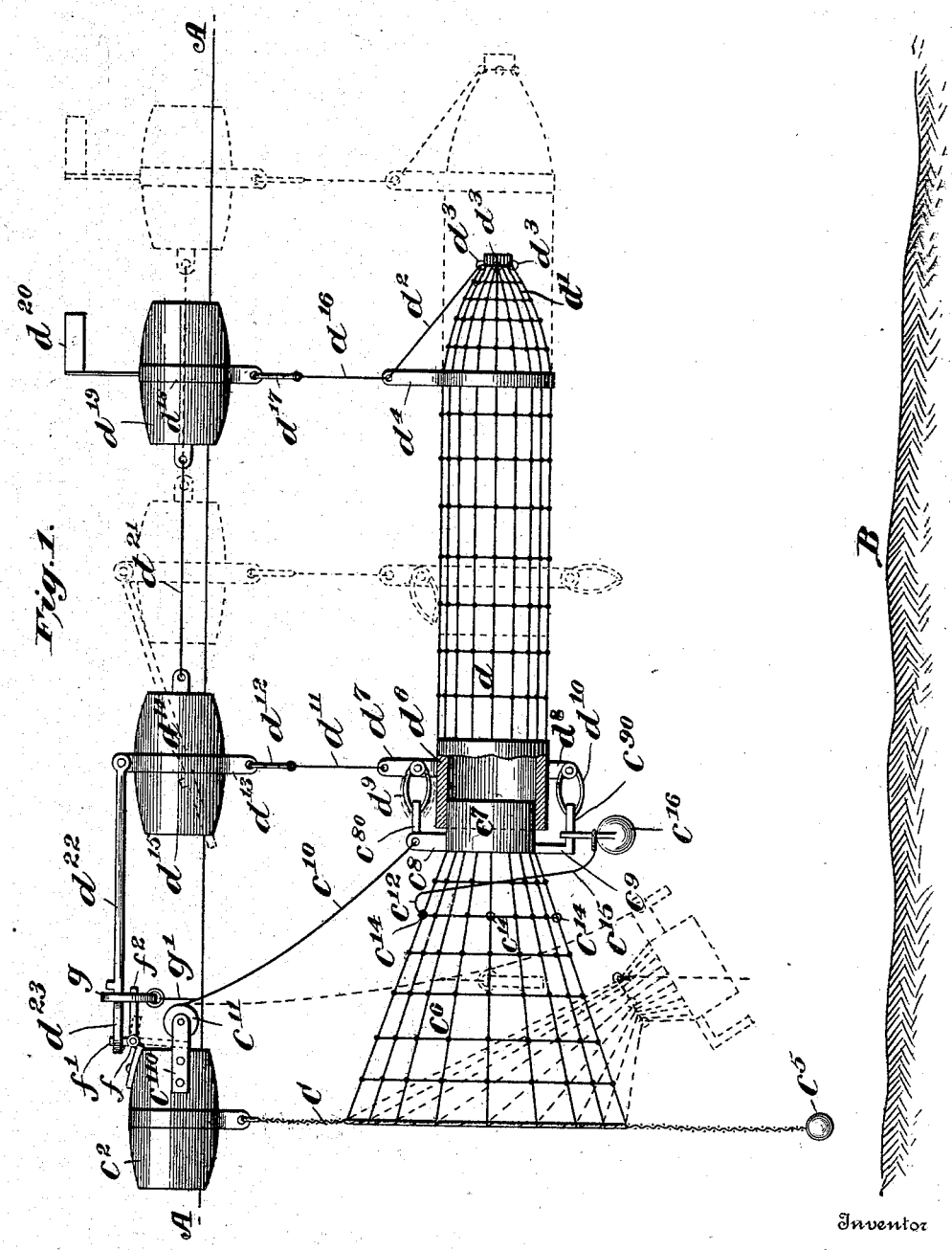

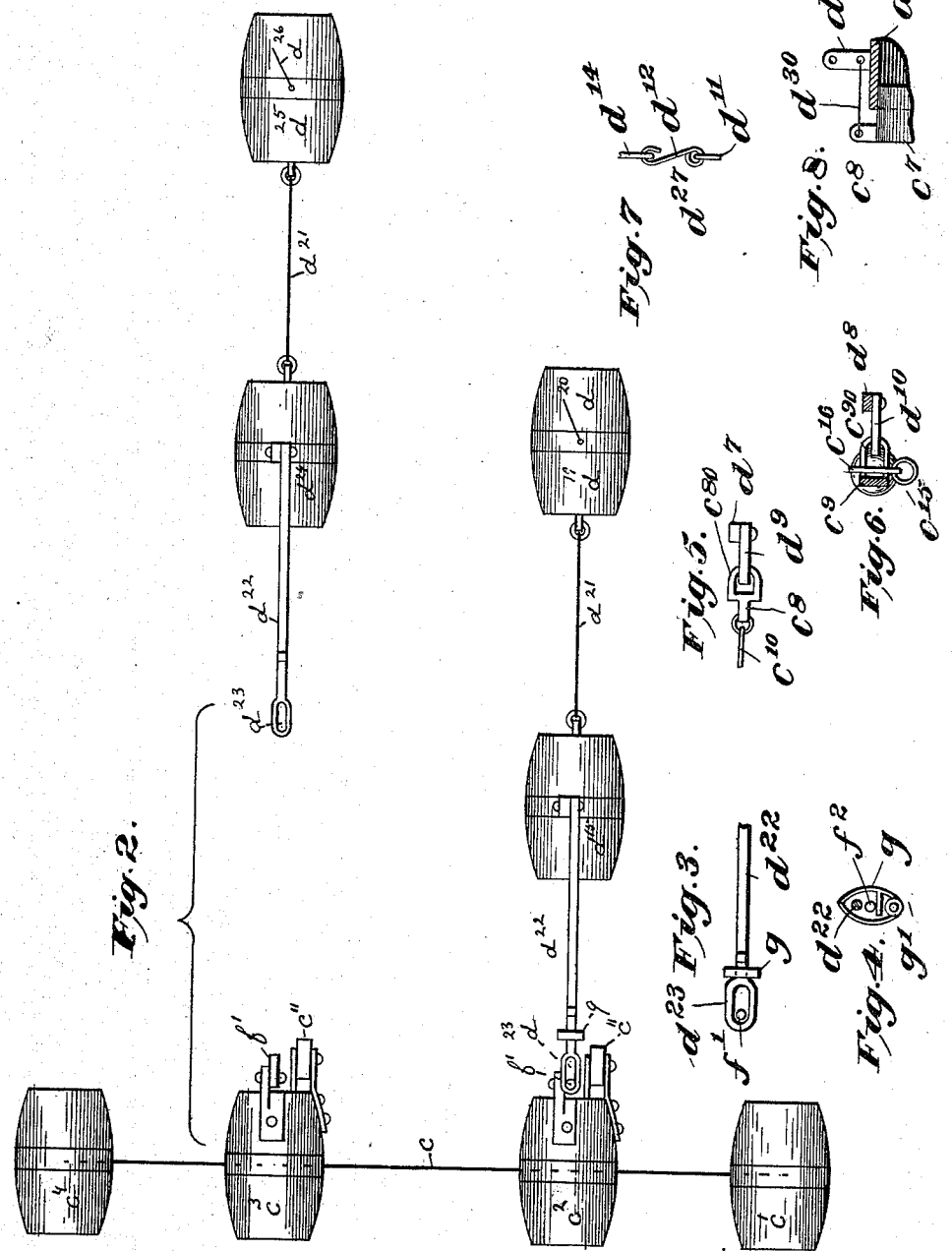

CHARLES F. PIKE, OF PHILADELPHIA, PENNSYLVANIA.

FISHING-NET.

SPECIFICATION forming part of Letters Patent No. 716,097, dated December 16, 1902.

Application filed May 10, 1902. Serial No. 106,742. (No model.)

*To all whom it may concern:*

Be it known that I, CHARLES F. PIKE, a citizen of the United States, residing at 2132 North Twentieth street, Philadelphia, in the county of Philadelphia and State of Pennsylvania, have invented certain new and useful Improvements in Nets for Fishing, of which the following is a specification.

This invention relates to means for catching fish, and more especially for catching large fish—such, for instance, as the porpoise. The porpoise being, like many other fish, large and powerful, the entanglement of even a small number of them in an ordinary seine or a fixed or floating standing net, such as are now in common use, renders them unmanageable, and they are very liable to damage or destroy the seine or net and effect their escape.

The object of my invention is to provide means for catching such large fish whereby all such difficulties are obviated; and to this end my invention consists, broadly, in smaller or auxiliary nets to catch and hold a single large fish provided with means for locating them in the path of the fish and for automatically detaching such auxiliary nets from their connections and permitting them to float away with the fish therein, whereby each fish may struggle to release himself from the single net in which he is held until he has exhausted himself.

The invention further consists in means for attaining the before-mentioned objects by providing ordinary hauling-seines or fixed or floating standing nets with auxiliary nets for catching single large fish detachably secured thereto at openings in said seines or standing nets and with means operated by fish in the auxiliary nets for releasing or detaching said auxiliary nets from the seine or standing net, closing the openings thus left in said seine or standing net, and securing the fish in the detached auxiliary nets.

The invention further consists in the improved construction, arrangement, and combination of the parts of means for catching large fish, as will be hereinafter fully described and afterward particularly pointed out in the appended claims.

In the accompanying drawings, in which I have illustrated one embodiment of my invention, Figure 1 represents in side elevation a seine or standing net provided with auxiliary nets, one of such nets being shown as detached and floating away. Fig. 2 is a plan view of the same, the positions of the seine or standing net and of the auxiliary nets being indicated by the floats. Fig. 3 is an enlarged detail view in plan of part of the lever connecting the seine-floats and the auxiliary-net floats. Fig. 4 is an enlarged detail view in elevation of the upper spring-clasp and connections. Fig. 5 is an enlarged detail view in plan of the same and adjacent parts. Fig. 6 is an enlarged detail view in plan of the lower spring-clasp and adjacent parts. Fig. 7 is a detail view of the hook connection between the auxiliary net and its floats. Fig. 8 is an enlarged detail view of a modification of the parts connected with the lower spring-clasp.

Like letters of reference indicate the same parts wherever they occur in the several figures of the drawings.

Referring to the drawings, the line A indicates the surface of the water and B the bottom of the body of water in which the invention is to be operated.

C indicates any suitable fixed or floating support to which the auxiliary nets forming parts of my apparatus are to be removably secured, such support C being usually a seine or other fish-catching device, such as a standing or floating net of any suitable construction, to be set or hauled in the path of the fish to be caught. In this instance I have illustrated at C a seine or floating net, and although throughout this specification I shall refer to C as a "seine" I desire it to be understood that I do not confine myself to the construction known as a "seine," but hold that term for the purposes of this specification to be broad enough to indicate any suitable device for holding my auxiliary nets in their operative positions. The seine is provided with any desired form of floats, as at $c'$ $c^2$ $c^3$ $c^4$, and with the usual sinkers, as at $c^5$, as shown in Fig. 1, the floats being shown also in Fig. 2. At suitable intervals the seine is provided with openings, from which extend rearwardly conical mouths, as at $c^6$, each of which terminates in a ring $c^7$, to the top and bottom of which are secured, respectively, two lugs or bars $c^8$ and $c^9$, which are vertically-placed bars provided at their ends with horizontal loops or links $c^{80}$ and $c^{90}$.

$c^{10}$ indicates a rope, the lower end of which is secured to lug $c^8$, while its upper end is wound upon a reel $c^{11}$, journaled in bars or brackets $c^{110}$, secured to one of the floats of the seine, in this instance to the float $c^2$. Upon the conical mouth $c^6$ are secured rings $c^{14}$ $c^{14}$, through which is rove, in the form of a lasso-loop, a rope $c^{12}$, the other end of this rope carrying a weight $c^{16}$, which is loosely suspended upon the lower lug $c^9$.

My auxiliary nets are of any suitable form to contain a fish, being represented in this instance, as at $d$, as of tubular form with its outer or rear end $d'$ closed by any suitable means—as, for instance, by a rope $d^2$, which is rove or run through rings $d^3$ $d^3$ $d^3$, made fast at its outer end to a band $d^4$, surrounding the net near that end. The opposite end of the net $d$ terminates in a ring $d^6$, to which are secured at top and bottom, respectively, the lugs $d^7$ and $d^8$, to which are pivotally secured spring-clasps $d^9$ and $d^{10}$, which when the auxiliary net is in position, connected to the conical mouth $c^6$, respectively engage the loops or links $c^{80}$ and $c^{90}$ of the lugs $c^8$ and $c^9$, (see Figs. 5 and 6) and prevent the accidental separation of the auxiliary net from the conical mouth $c^6$ of the seine.

The inner end of the auxiliary net is supported by a rope $d^{11}$, which at its lower end is secured to a lug $d^7$ of ring $d^6$ and at its upper end to a hook $d^{12}$, preferably open at one end, and engaging lug $d^{13}$, depending from a band $d^{14}$ of a float $d^{15}$, while the outer or rear end of the net is similarly supported by a rope $d^{16}$, secured at its lower end to band $d^4$ and connected at its upper end by a similar hook $d^{17}$ to a band $d^{18}$ of a float $d^{19}$, which is preferably provided with a flag $d^{20}$.

The floats $d^{15}$ and $d^{19}$ are connected together and held apart by a connecting-rod $d^{21}$, whereby the net is supported at both ends.

Upon the seine-float $c^2$ is pivoted a bell-crank lever $f$, and when the auxiliary net is connected with the seine serves to maintain the seine-float and net-floats in connection through the medium of a lever $d^{22}$, pivoted to the band $d^{14}$ of float $d^{15}$, having a loop end $d^{23}$, which is passed over the arm $f'$ of said bell-crank lever. (See Fig. 3.) These parts are yieldingly held in their connected position by a spring-clasp $g$, which engages the lever $d^{22}$ and the arm $f^2$ of the bell-crank lever $f$, (see Fig. 4,) said spring-clasp hanging from said parts when thus engaged and having its lower end attached, by means of a rope $g'$, to the rope $c^{10}$, before described.

A porpoise encountering the seine and seeking to escape enters one of the conical mouths and passes into one of the auxiliary nets. Upon coming into contact with the closed end of the net strain is brought to bear upon the spring-clasps $d^9$ $d^{10}$, causing them to open, as shown by the dotted lines, and allow the auxiliary net to move away from ring $c^7$ of the conical mouth $c^6$. The ring $c^7$ of the conical mouth $c^6$ then sinks, allowing the weight $c^{16}$ of the loop or lasso $c^{12}$ to slip off of lug $c^9$, drawing the loop or lasso upon the conical mouth, and thus closing it, as shown in dotted lines in Fig. 1. At the same time the rope $c^{10}$ is uncoiled from reel $c^{11}$, thus drawing on rope $g'$ and disengaging the spring-clasp $g$ from lever $d^{22}$, allowing the bell-crank lever $f$ to fall to the position shown in dotted lines and releasing the connecting-lever $d^{22}$, thus disconnecting floats $d^2$ and $d^{14}$. The net acts as a gill-net and prevents the fish from backing out, and his struggles cause the auxiliary net to float away, as shown in the dotted lines in Fig. 1 and by the separated floats $d^{24}$ $d^{25}$ in Fig. 2, the seine remaining undisturbed with the conical mouth closed up.

When the porpoise has exhausted himself, a vessel is brought to the auxiliary net, and a line from the hoisting device is made fast to the eye $d^{27}$ of the hook $d^{12}$, which is disengaged from the band $d^{14}$. At the same time the hook $d^{17}$ is disengaged from the band $d^{18}$, and the auxiliary net $d$, with the porpoise in it, is hoisted on board the vessel. The rope $d^2$ is cast off of the band $d^4$, whereby the net opens and allows the porpoise to pass out on the deck. By means of the rope $c^{10}$ the ring $c^7$ can be raised to the surface of the water and another auxiliary net attached to the seine ready for use.

It is evident that the arrangement and construction may be greatly varied without departing from the spirit of the invention.

In Fig. 8 a spun yarn $d^{30}$ is substituted for the spring-clasp $d^9$. The lasso $d^2$ might be dispensed with, as also the connecting-bar $d^{22}$, and the shape of the conical opening could be changed. It is also evident that the auxiliary nets can be detached by hand in the case of small fish and may be adjacent to each other or continuous.

Having thus fully described my invention, what I claim as new, and desire to secure by Letters Patent of the United States, is—

1. The combination with a suitable support held in the path of fish, of an auxiliary net removably attached in operative position thereto, and means operable by a fish caught in the auxiliary net, whereby the auxiliary net is detached.

2. A net for catching and holding a fish provided with means for removably securing it in operative position, and devices operable by a fish caught in the net, whereby the net may be released.

3. A net for catching and holding a fish provided with floats for supporting it, in combination with means for removably securing the net in operative position, and releasing means operable by a fish caught in the net, whereby the net is detached and permitted to float off with the fish in it.

4. The combination with a seine, of an auxiliary net removably secured thereto, and means, operable by a fish caught in the auxiliary net, whereby said auxiliary net is detached from the seine.

5. The combination with a seine having an opening, of an auxiliary net removably secured about said opening, and means, operable by a fish caught in the auxiliary net, for detaching the auxiliary net and closing the opening in the seine.

6. The combination with a seine having an opening, and an auxiliary net constructed to prevent the escape of the fish, having a normally closed exit and normally distended entrance, and removably secured to the seine with its distended entrance about the seine-opening, of means, operable by a fish caught in the net, for detaching the entrance end of the net from the opening of the seine, and closing the opening of the seine.

7. The combination with a seine having floats, and a removably-secured auxiliary net having floats, of means, operable by a fish caught in the auxiliary net, whereby the net may be detached from the seine and permitted to float off with the fish.

8. The combination with a seine having an opening and a conical mouth projecting rearwardly therefrom, of an auxiliary net removably secured to said conical mouth, and means operable by a fish caught in the net for releasing the connection between the seine and net.

9. The combination with a seine having an opening a conical mouth projecting rearwardly from said opening, a ring in the rear end of said mouth, and lugs on said ring, of an auxiliary net, and spring-clasps thereon for engaging said lugs.

10. The combination with a seine having a suitable float and an opening, of an auxiliary net removably secured about said opening and having a suitable float, means for detachably connecting the floats of the seine and net, and devices operable by the detaching of the net from the seine for releasing the connections between the floats of the seine and net.

11. The combination with a seine having a conical mouth terminating in a ring, and a lug on the lower side of said ring, of rings secured around the conical mouth near its rear end, a loop or lasso rove through said last-named rings, and a weight on the free end of the lasso normally supported from said lug.

12. The combination with a seine having a float, and an auxiliary net having a float, of a bell-crank lever pivoted on the seine-float, a connecting-lever pivoted to the net-float and provided with a loop engaging one arm of the bell-crank lever, and a spring-clasp normally engaging the connecting-lever and the other arm of the bell-crank lever.

13. The combination with a seine having a float and a conical mouth, and an auxiliary net having a float, of a bell-crank lever pivoted on the seine-float, a connecting-lever pivoted to the net-float and provided with a loop engaging one arm of the bell-crank lever, a spring-clasp normally engaging the connecting-lever and the other arm of the bell-crank lever, and a rope connecting the spring-clasp with the conical mouth.

In testimony whereof I affix my signature in presence of two witnesses.

CHARLES F. PIKE.

Witnesses:
GRACE B. HURLBUT,
ISAAC JACKSON.